Aug. 23, 1960  B. F. BOEHM  2,949,794
OVERDRIVEN TORQUE CONVERTER TRANSMISSION
Filed April 26, 1956  3 Sheets-Sheet 1
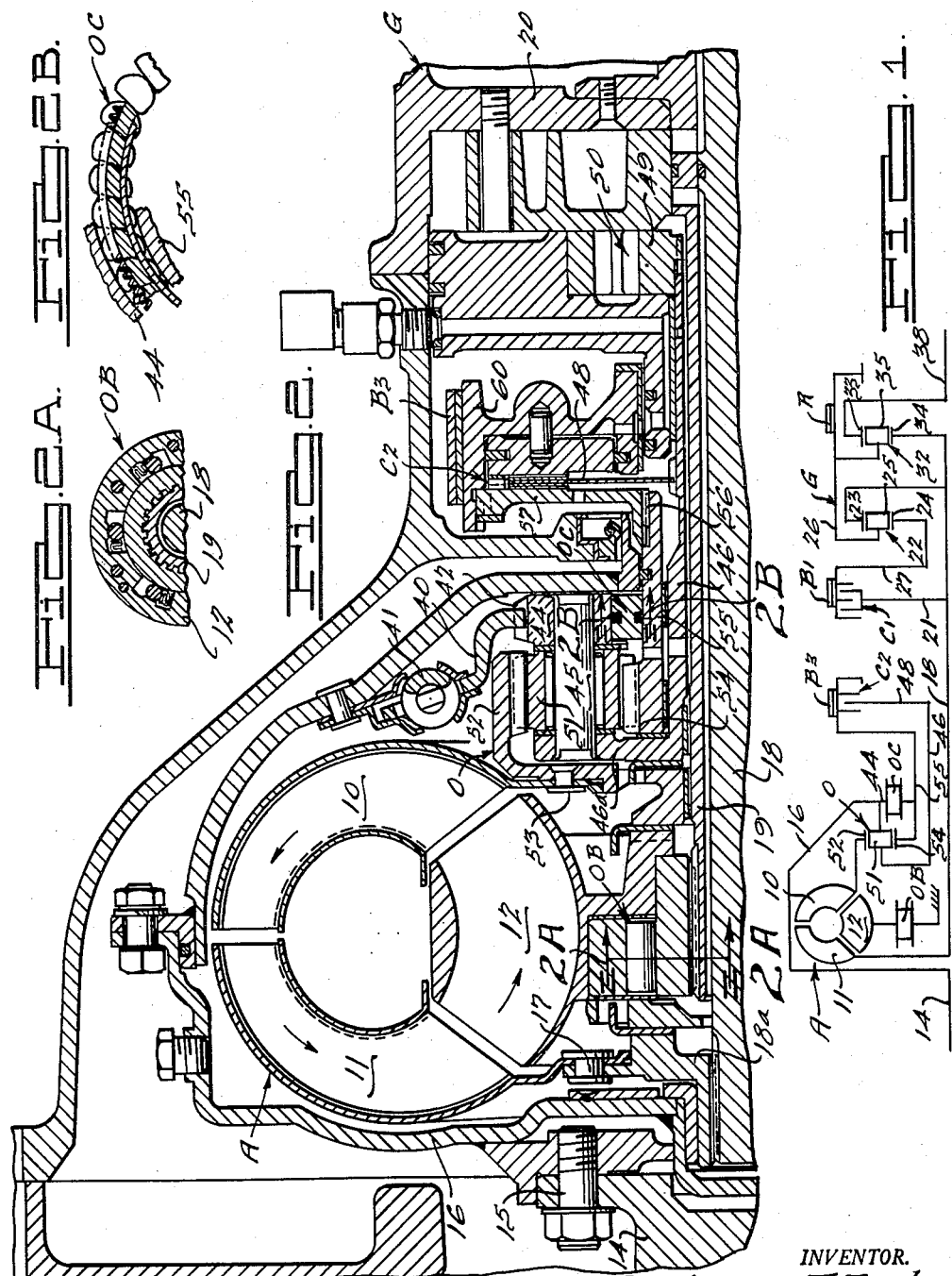
INVENTOR.
BY
*Harness and Harris*
ATTORNEYS.

Aug. 23, 1960  B. F. BOEHM  2,949,794
OVERDRIVEN TORQUE CONVERTER TRANSMISSION
Filed April 26, 1956  3 Sheets-Sheet 2
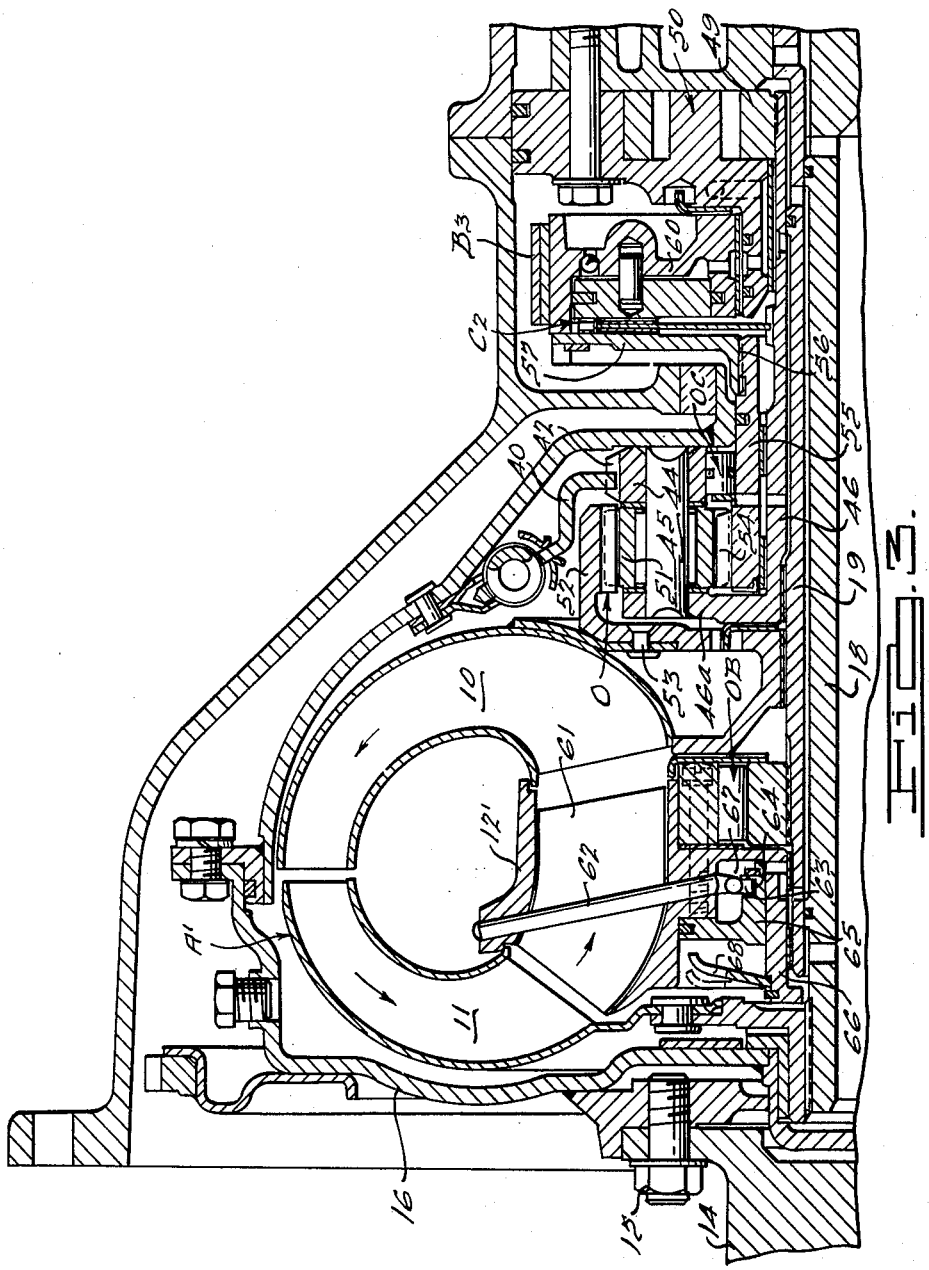
INVENTOR.
Benjaman F. Boehm.
BY
Harness and Harris
ATTORNEYS.

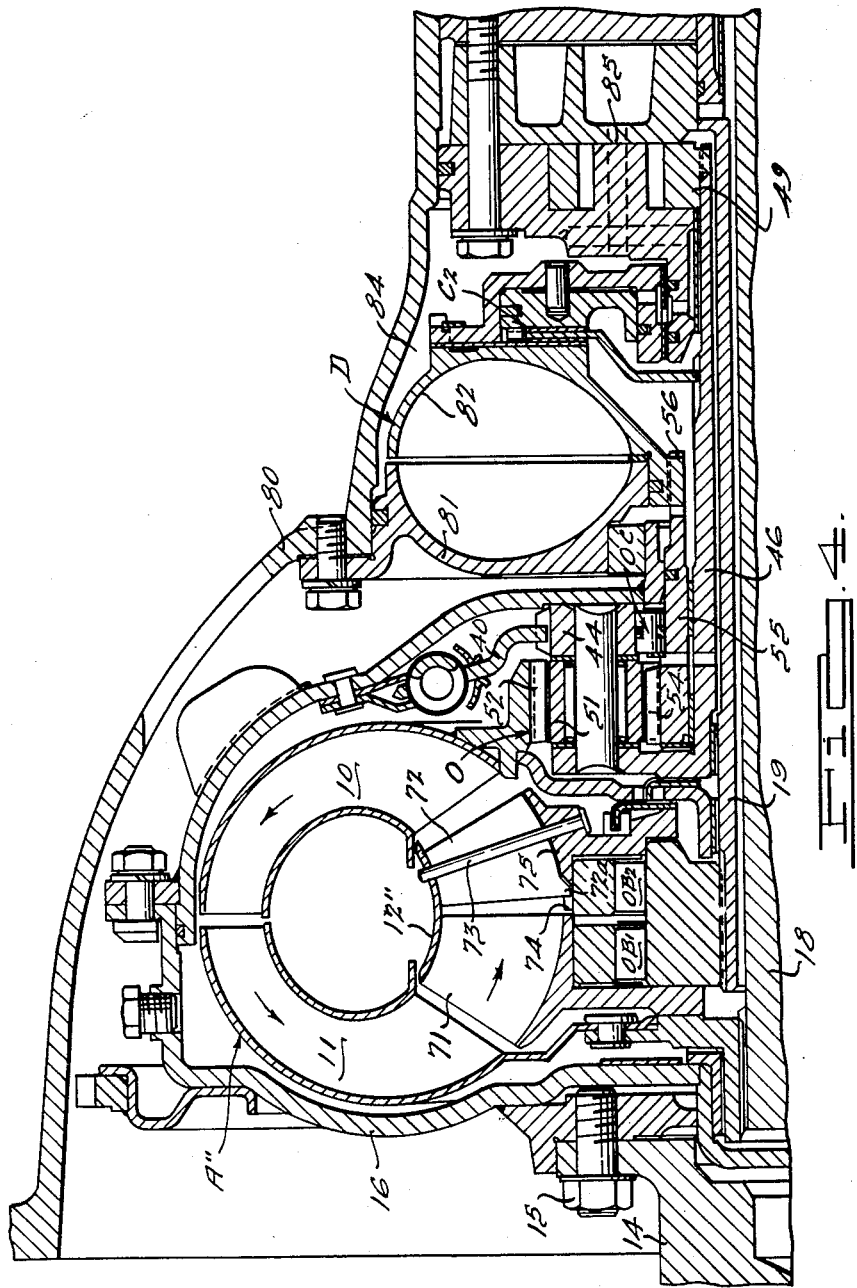

2,949,794
OVERDRIVEN TORQUE CONVERTER TRANSMISSION

Benjamin F. Boehm, Oak Park, Mich., assignor to Chrysler Corporation, Highland Park, Mich., a corporation of Delaware Filed Apr. 26, 1956, Ser. No. 580,773

4 Claims. (Cl. 74—732)

This invention relates to a three forward speeds and reverse drive torque converter driven transmission wherein the third forward speed is an overdrive and particularly to such a transmission wherein the overdrive results from overdriving the torque converter impeller element in third speed.

It is a primary object of this invention to provide a simplified form of three speed transmission wherein an overdriven torque converter is associated with a two speed gear box to provide an improved form of three speed transmission.

It is still another object of this invention to provide a torque converter driven transmission wherein there can be reduced engine speed and improved fuel economy when operating in the top speed where the majority of the mileage is normally accumulated.

It is a further object of this invention to provide an improved form of torque converter driven transmission wherein economy is improved because of reduced slip in the top speed range due to the fact that the converter is overdriven in the top speed range. The slip is reduced as the torque is reduced on upshift to the overdrive range.

It is still another object of this invention to secure improved accelerating performance in the first and second speed ranges because of the fact that the torque converter used with this transmission can have a higher stall speed than would otherwise be acceptable because it is overdriven in the third speed.

Other objects and advantages of this invention will become readily apparent from a reading of the following description and a consideration of the related drawings wherein:

Fig. 1 is a diagrammatic view of a torque converter driven transmission that embodies one form of this invention;

Fig. 2 is a sectional elevational view of the torque converter and associated overdrive gearing that is shown diagrammatically in Fig. 1;

Fig. 2A is a fragmentary sectional elevational view taken along the line 2A—2A of Fig. 2;

Fig. 2B is a fragmentary sectional elevational view taken along the line 2B—2B of Fig. 2;

Fig. 3 is a sectional elevational view of another form of torque converter and overdrive gearing that can be used with the transmission gearing shown in Fig. 1; and Fig. 4 is a sectional elevational view of still another form of torque converter and overdrive gearing that can be used with the transmission gearing shown in Fig. 1.

This invention relates to a transmission (see Fig. 1) comprising a torque converter A having overdrive gearing O arranged therewith such that the converter impeller member 10 is driven by the gearing O. The converter turbine member 11 is drivingly connected to a two forward speeds planetary gear box G that is arranged rearwardly of and in series with the converter A. As a result of the connection of the overdrive gearing O to the impeller element 10 of the converter A, this transmission unit provides a three speeds forward and reverse transmission unit in which the third forward speed is an overdrive ratio that gives exceptional economy as well as reduced engine noise and reduced engine wear.

Performance is excellent in first or low speed with this transmission because the engine is directly connected to the converter impeller 10 through the locked-up converter overdrive gearing O. Accordingly, the converter turbine member 11 transmits a converter multiplied torque to the planetary gear box G. In low speed the brake $B_1$ of gearing G is applied and the gearing G is also arranged to multiply torque. The combined converter and gearing multiplied torque provides an exceptionally fast accelerating or breakaway ratio. One reason for this is the fact that the converter A of this transmission is designed for a relatively high engine stall speed with the torque multiplication being retained over a relatively wide vehicle speed range. This results from the fact that in third speed drive, where the major portion of the driving will be accumulated, the converter impeller 10 is overdriven by the gearing O and the engine speed is only two-thirds of the impeller speed. Economy is high and engine noise and wear are low when the engine can be operated at relatively low speeds.

After starting in the low or first forward speed with the gearing G set for underdrive and overdrive gearing O locked up, the transmission control system, not shown, will apply clutch $C_1$ and lock up the forward underdrive gearing of the gear box G so that a direct drive is transmitted by the gear box G when the transmission upshifts to second or intermediate forward speed. At this time the converter A will still be directly driven by the engine, due to lock up of gearing O, and the converter A will be operating in either the lower portions of its torque multiplication range or merely functioning as a simple fluid coupling and transmitting torque at substantially a 1 to 1 ratio. Thus it will be seen that second or intermediate forward speed in this transmission is essentially a direct drive with both the converter A and gearing G transmitting torque at substantially 1 to 1.

At some subsequent time, depending on the type of control system used with this transmission, the overdrive gearing O, which had been locked up to directly transmit engine torque during the first and second speed forward drives, is now automatically activated by the application of the brake band $B_3$ so that the vehicle engine will now overdrive the converter impeller 10 and its associated turbine element 11. Gearing G remains locked up and directly transmits the torque of the converter turbine element 11. Thus it will be seen that in the third forward speed an overdrive ratio is provided due to the overdriving of the converter impeller 10 by the overdrive gearing O.

Considering now Figs. 1 and 2, numeral 14 represents the engine crankshaft that is drivingly connected by bolts 15 to the casing 16 of the torque converter A. Rotatably mounted within the converter casing 16, for conjoint and relative rotation, are the vaned impeller wheel 10, the vaned turbine wheel 11 and the vaned reaction or stator wheel 12. Vaned impeller wheel 10 is drivingly connected to and supported by the overdrive gearing O as will be subsequently described. Vaned turbine wheel 11 is drivingly connected by rivet means 17 to the hub 18a on the gear box drive input shaft 18. Vaned reaction or stator wheel 12 is rotatably supported by the one-way brake device OB (see Fig. 2A) on the sleeve shaft 19 that is fixed to the housing wall 20 of the gear box G. One-way brake OB will permit the vaned reaction wheel 12 to rotate clockwise in the same direction as the driving impeller 10 but will prevent rotation of the reaction wheel 12 in the opposite direction.

Shaft 18, that is driven by the torque converter turbine 11, has drivingly connected thereto a spider element 21 (see Fig. 1) that carries clutch disc elements that form a part of the gearing lockup or direct drive clutch $C_1$. Shaft 18 also drivingly mounts an annulus gear 23 of the planetary gear set 22 and a sun gear 34 of another, axially spaced, planetary gear set 32. Annulus gear 23 meshes with pinion gearing 25 that is rotatably mounted on a carrier 26. Pinion gearing 25 also meshes with a sun gear 24 that is supported by and drivingly connected to a brake drum 27. Brake drum 27 is adapted to be engaged by the brake band $B_1$ to condition the gearing G for the transmission of the low or first speed forward underdrive ratio when clutch $C_1$ and brake band R are released.

Shaft mounted sun gear 34 meshingly engages pinion gearing 35 that is also rotatably mounted on the carrier drum 26. The pinion gearing 35 also meshes with an annulus gear 33 that is drivingly connected to the gear box output shaft 38. A brake band R is arranged to be applied to the pinion carrier drum 26 to anchor the pinion gearing 35 against rotation and provide for the transmission of a reverse drive to the output shaft 38 when brake band $B_1$ and direct drive clutch $C_1$ are released.

It will be noted that the brake drum 27 associated with the gear set 22 also mounts a plurality of clutch discs that form part of direct drive clutch $C_1$ and that are arranged to be engaged with the clutch discs carried by the spider element 21. When clutch $C_1$ is engaged then each of the gear sets 22, 32 is locked up and a direct drive is transmitted between gear box input shaft 18 and output shaft 38.

It is thought to be quite obvious that the gear box G herebefore described is adapted to provide a forward underdrive and a forward direct drive. In addition this gear box G will transmit a reverse drive between the shafts 18 and 38. The details of this gear box G and its method of operation are given in A. J. Syrovy et al. application Serial No. 238,646, filed July 26, 1951, now U.S. Patent No. 2,748,622.

Drivingly connected to the inside of the torque converter casing 16 is a drive transmitting plate 40. Drive plate 40 is similar to a clutch drive plate and includes compression springs 41 to cushion impact forces and damp vibrations. Plate 40 has its inner periphery connected by splines 42 to a ring element 44. Ring 44 is connected by studs 45 to a flange 46a on the end of the sleeve shaft 46. Sleeve shaft 46 has drivingly connected thereto a clutch drive plate 48 and the driving gear 49 of an engine driven oil pump 50.

The pins 45 that connect the ring 44 to the shaft 46 also provide journals for the pinion gearing (only one shown) 51 of the overdrive planetary gear set O. Pinion gearing 51 meshingly engages with an annulus gear 52 that is drivingly connected to the outer shell of the converter impeller 10 by the rivet connectors 53. Also meshing with the aforementioned pinion gearing 51 is a sun gear 54. Sun gear 54 is provided with a hollow shaft supporting portion 55 that is connected by splines 56 to the backing plate 57 of the clutch $C_2$.

Mounted between the converter casing carried ring 44 and the inwardly disposed, concentrically arranged, sun gear support shaft 55 is a one-way clutch device OC. One-way clutch device OC is of the sprag type (see Fig. 2B) but obviously some other equivalent form of one-way clutch could be used. One-way clutch OC is arranged such that it will prevent the sun gear 54 from overrunning the pinion gear carrier 44—46, the pinion gearing 51 and the attached converter casing 16 when the latter are driven clockwise whereas the pinion gear carrier 44—46, the pinion gearing 51 and the engine driven converter casing 16 can overrun the sun gear 54 during clockwise rotation of the casing 16. Accordingly, it is the arrangement of the one-way clutch OC in the overdrive gear set O that provides for lock-up of gear set O during first and second forward speed drives so that the converter impeller 10 will be driven at engine speed when operating in these two drive ratios. It is also this one-way clutch OC that permits overrun of the pinion gearing 51 and associated carrier 44—46 when sun gear 54 is anchored against rotation by the application of brake band $B_3$ to the cylinder 60 of the clutch $C_2$. Cylinder 60 is splined to the backing plate 57 that is drivingly connected to the sun gear 54 by the shaft 55.

Operation of the transmission shown in Figs. 1 and 2 may now be summarized. For initiating forward drive a drive selector element would merely be shifted from its neutral position to the forward drive position and the control system (not shown) would then apply gear box brake band $B_1$ while the other servo-operated clutches and brakes remained released. Depression of the engine accelerator would drive the converter casing member 16 at engine speed. Rotation of converter casing 16 at engine speed would drive converter impeller 10 at engine speed because the one-way clutch OC would lock up the overdrive gearing O due to the clutch connection of the pinion carrier 44—46 to the sun gear 54. Impeller 10 would drive turbine 11 at multiplied engine torque and the shaft 18 would transmit the multiplied engine torque to the gearing of gear box G. As the gear box gearing is set for underdrive because of the application of brake band $B_1$, the converter multiplied engine torque is further multiplied by the compounded gearing 22, 32 and a highly effective, accelerating, low speed underdrive ratio is provided for breakaway forward drive.

When vehicle speed and/or engine throttle valve position or the driver's judgment indicate that the gear box gearing should be converted into a direct drive train to provide the second or intermediate forward speed drive, then the control system is operated, automatically or manually, to cause engagement of direct drive clutch $C_1$ and release of the brake band $B_1$. Now the converter impeller 10 will still be driven at engine speed and the converter turbine 11 will then transmit drive directly to the transmission gear box output shaft 38 because of the lock-up of the gearing 22, 32. Converter A can be operating in the lower portion of its torque multiplication range at this time or it may be operating merely as a fluid coupling transmitting drive at substantially a 1 to 1 ratio.

At some subsequent point, presumably when the torque load has been somewhat relieved, the control system will merely apply the brake band $B_3$, while the clutch $C_1$ remains applied, and then the previously locked up overdrive gearing O will be activated to cause the converter impeller 10 to be overdriven by the engine. At this time, for a given turbine speed, the engine will merely have to turn at a fraction of the turbine speed and thus engine noise and vibration as well as engine wear are materially reduced and engine fuel economy will be materially improved. As the majority of the driving under normal conditions will be accumulated in this third speed overdrive ratio it is readily understandable why this type of transmission is desirable.

In addition to automatic means for downshifting from third speed to second speed and second speed to first speed, it is also preferred to have driver operable means to manually overrule the automatic controls and permit the selection of the downshift or kickdown points at the driver's option. Such controls are available in present day three speed transmissions and can be readily applied to this transmission. Disclosure of specific controls has not been made in this application because they form no part of this invention.

While manually and automatically operated upshifts and downshifts may be readily effected with this transmission, it is also necessary that an effective coasting underdrive ratio be provided for coast braking purposes. For coast braking the gear box G will be conditioned for underdrive by the application of brake band $B_1$ while clutch $C_1$ is released and in addition coast clutch $C_2$ will be applied while band $B_3$ is released. Clutch $C_2$ must be engaged to provide an effective coast ratio for otherwise the converter turbine 11 could not be tied to the engine driven casing 16 due to the fact that the impeller mounted annulus gear 52 can normally overrun the sun gear 54. As one-way clutch OC will not lock up the overdrive gearing O during coast drive, the coast clutch $C_2$ must be engaged to positively lock up the overdrive gearing O and drivingly connect the converter turbine 11 to the engine driven casing 16 during coast drive.

During reverse drive is the only time that the brake band R is applied. Overdrive gearing O is activated at this time by also applying brake band $B_3$ during the reversed drive. A reverse drive is obtained under these conditions that is very acceptable. The engine overdrives the converter turbine 11 which causes the sun gear 34 of gear set 32 to drive the annulus gear 33 in a reverse direction for the transmission of a reverse drive.

A preferred set of speed ratios for this type of transmission is set forth in the table below although other values may be used equally as well.

| Gear | Trans. Ratio | Member Applied | Overall Ratio |
| --- | --- | --- | --- |
| Low_____(1st)_____ | 1.72 | OC and $B_1$____ | 17.62-6.41 |
| (Coast)__ | _____ | $C_2$ and $B_1$____ | _____ |
| Direct_____(2nd)_____ | 1.00 | OC and $C_1$____ | 3.73 |
| Overdrive_____(3rd)_____ | 0.648 | $B_3$ and $C_1$_____ | 2.416 |
| Reverse_____ | 1.55 | $B_3$ and R_____ | 15.89-5.78 |
| 3.73 Axle Ratio | | 2.75 Converter Ratio | |

Fig. 3 shows a modified form of this invention wherein the impeller element 10 of the converter A' is overdriven in the same manner and by the same mechanisms shown and described with respect to Figs. 1 and 2. Parts of the Fig. 3 construction that are identical to those described with regard to the Fig. 2 form of this invention are identified by the same reference numerals in each of these two forms of the invention. It is thought to be obvious that the Fig. 3 converter can be used with the planetary gearing G that is shown schematically in Fig. 1 or with any other type of gear box. The primary distinction between the Fig. 3 converter A' and the Fig. 1 converter A is that the reaction wheel 12' of the converter A' has angularly adjustable vanes 61 whereas the vanes of the reaction wheel 12 of the converter A are fixed. Each of the vanes 61 of reaction wheel 12' is carried by a pivot shaft 62 that has a crank arm 63 formed on its inner end. Each crank arm 63 is seated in a groove 64 formed in a piston 65. Piston 65 is arranged to reciprocate axially of the sleeve 66. A pressurized fluid which is responsive to engine throttle valve opening, vehicle speed and/or some other control criterion is supplied to the piston cylinder 67 to move the piston 65 forwardly and rotate the reaction wheel vanes 61 from their low torque multiplication low slip positions to their high torque multiplication, high slip positions. Piston 65 engages a plate type spring 68 when it is moved forwardly to the converter high torque multiplication position. Spring 68 will be deflected by piston 65 to the position shown in broken lines when the vanes 61 are moved to their high torque multiplication position. Spring 68 acts as a piston return spring to urge the piston 65 back to its normal, low torque multiplication position when pressurized fluid is not directed into the cylinder bore 67. The advantage of the converter construction shown in Fig. 3 is that it not only provides for an overdrive in third speed so as to improve fuel economy and reduce engine noise and wear but in addition exceptional kickdown accelerating performance is provided due to the angular adjustment of the reaction wheel vanes 61. It is recognized that angularly adjustable converter reaction wheel vanes are known to the art but it is not thought that the combination of such a reaction wheel with an overdriven converter impeller wheel has been disclosed previously. Nor is this type of converter unit combined with the specific type of planetary gear box G known to the inventor.

Fig. 4 shows a third form of this invention wherein a still different form of converter A" is provided for use with the gearing G. As with the Fig. 3 form of this invention, all elements of the converter A" that are identical to those used in the converter A of the Fig. 2 form bear the same reference numeral as assigned to them in Fig. 2. In the Fig. 4 form of the invention, the converter reaction wheel 12" is formed with a set of fixed vanes 71 and a set of angularly adjustable vanes 72. Vanes 72 are each pivotally supported on a pivot shaft 73 and the vanes have tip portions 72a that have limited oscillatory movement in slots 74 formed in the hub portion 75 of the reaction wheel 12". Pivot shafts 73 are located rearwardly of or offset from the center of pressure of the vanes 72 so that the vanes are eccentrically mounted to insure snap action shift of the blades 72 between their two limiting positions. It will be noted that two separate one-way brake devices $OB_1$ and $OB_2$ are used in this form in order to permit ready assembly of the wheel 12". Each one-way brake is like the device shown in Fig. 2A.

The converter reaction wheel 12" is arranged such that the direction and velocity of flow of the circulating converter fluid (see arrows) that is discharged by the turbine wheel 11 into the reaction wheel 12" automatically shifts the adjustable vanes 72 between their high torque multiplication and low torque multiplication positions. At low engine torque drive in either low or second speed drive and during operation in the overdrive ratio, the fluid discharged by the turbine 11 into the reaction wheel 12" will shift the adjustable vanes 72 to their low torque multiplication position where the converter efficiency is higher. However, when the engine throttle is fully depressed for overcoming a high torque load, as during kickdown or on breakaway starts, the turbine discharged fluid will have such a direction and velocity that the adjustable vanes 72 will be turned to their high torque multiplication positions for maximum converter torque multiplication.

Another feature of the converter unit A" shown in Fig. 4 is the use of a fillable fluid coupling D as the brake means for activating the overdrive gearing O. Coupling D is used instead of the conventional planetary brake band $B_3$ that was used for actuating the gearing O in Figs. 2 and 3. Coupling D comprises a vaned ring 81 that is fixed to the transmission housing 80 and a complementary vaned rotatable ring 82 that is supported by and drivingly connected at 56 to the shaft 55 that supports the overdrive sun gear 54. It will be noted that the coupling D is mounted in a closed compartment 84 of housing 80 that also encloses the coast drive clutch $C_2$. The reason for the closed compartment 84 will become apparent from the following description.

When the Fig. 4 transmission is operating in the low or the second speed direct drive ratio, then the overdrive gearing O is locked up and the coupling D is empty so that the coupling wheel 82 may be freely rotated by the locked up overdrive gearing O. However, when the overdrive third speed ratio is to be activated then pressurized fluid is fed into the closed compartment 84 and the coupling D will be filled so that then the coupling D acts as a brake to hold the overdrive sun gear 54 against rotation. Fluid may be fed into the closed compartment 84 through the passage 85 which will also serve as a drain vent when fluid is to be removed from the compartment 84. Clutch $C_2$ which is used for coast drive lock-up of the overdrive gearing functions in the same manner as explained with regard to Fig. 2 and does not affect the operation of the coupling D in any way.

It will thus be seen that this invention provides several forms of overdriven torque converters arranged in a novel manner with a simplified two-speed planetary gear box whereby an improved form of three speed transmission is provided having an overdrive ratio as the third speed to improve fuel economy and reduce engine noise, vibration and wear. Furthermore, by the use of an overdriven converter in the top or third speed ratio it is possible to use a converter with improved vehicle accelerating properties in the starting or low speed ratio and thus secure improved performance as well as improved economy.

The form of the invention shown in Fig. 4 provides an assisting turbo-brake action for coast drive braking if the transmission control system is arranged such that when the coast clutch $C_2$ is engaged the compartment 84 is filled with fluid. At this time the braking effect of the coupling D will supplement the engine braking and provide a very effective brake for coast drive.

While these transmissions (Figs. 1–4) have been described as providing three-speeds forward and single speed reverse drive transmissions, it is thought to be obvious that the disclosed structural arrangements also provide four speeds forward and two speeds reverse drive transmissions by simple changes in the control system to be used with the disclosed structures. While a single forward underdrive ratio has been described for the Figs. 1–4 transmissions wherein the converters A, A' or A'' are directly driven and the gearing G is in underdrive, still, it is obvious that the converters can also be overdriven at the time the gearing G is in underdrive and thus a second forward underdrive ratio can be provided.

Also, while in the Figs. 1–4 transmissions were described as providing a single reverse drive wherein the converters were overdriven and the gearing G arranged for a reverse underdrive, still, it is obvious that the converters can also be directly driven while the gearing G is arranged for the reverse underdrive. The flexibility of the disclosed transmissions is another very important advantage of this invention.

I claim:

1. In a transmission, a drive shaft, a hydrodynamic torque converter comprising a fluid filled casing drivingly connected to said drive shaft, relatively rotatable, vaned, impeller, turbine and reaction members mounted in said casing to provide a closed toroidal fluid circuit, said reaction member having automatically adjustable vanes to improve the accelerating properties of the turbine under load, a planetary gear set adjacent said casing connected between said casing and said impeller, one-way clutch means engaged between certain elements of said planetary gear set to normally lock-up said planetary gear set and condition said gear set for the direct drive of said impeller by said drive shaft, brake means selectively engageable with an element of said planetary gear set to condition said gear set for the overdrive of said impeller by said drive shaft, means drivingly connecting said turbine to the input shaft of a two-speed gear box and a clutch mechanism for the planetary gear set engageable to by-pass said one-way clutch means and drivingly connect said impeller to said drive shaft during coast drive when the turbine tends to drive the impeller, said gear box including aligned input and output shafts, a first and a second planetary gear train arranged axially along said shafts and adapted to be connected therebetween, said gear trains each including meshingly engaged sun, pinion and annulus gears, means drivingly connecting the annulus gear of the first gear train and the sun gear of the second gear train to each other and to the input shaft, carrier means supporting and drivingly connecting the pinion gearing of the first and second gear trains, means drivingly connecting the annulus gear of the second gear train to the output shaft, brake means to be selectively applied to the sun gear of the first gear train to condition the gearing for the transmission of a forward underdrive ratio to said output shaft and a clutch means engageable between said input shaft and the sun gear of the first gear set to lock up the gear box gearing and provide for the transmission of a direct drive between said input and output shafts of the gear box.

2. In a transmission, a driving shaft, a hydrodynamic torque converter comprising a casing, relatively rotatable, vaned, impeller, turbine and reaction wheels within said casing arranged to provide a closed toroidal fluid circulating circuit, said reaction wheel having variable pitch vanes automatically movable between low and high torque positions, an overdrive planetary gear train within the converter casing drivingly connected between said driving shaft and the impeller, said overdrive gearing comprising a planet pinion carrier drivingly connected to said casing and mounting rotatable pinion gearing, a ring gear meshing with the pinion gearing and drivingly connected to said impeller and a sun gear meshing with said pinion gearing, a first clutch means connected to said overdrive gear train and operable to lock-up the overdrive gearing and provide for direct drive of the impeller by the driving shaft, a housing enclosed, fillable, fluid coupling comprising a pair of vaned rings one of which is anchored against rotation and the other of which is drivingly connected to a rotatable gear element of the overdrive gear train, means operable to selectively fill and empty the fillable fluid coupling whereby said other vaned ring may be selectively permitted to rotate freely and to be restrained against rotation by the braking action of the filled coupling, said braking action causing the overdrive gearing to be activated to cause the impeller to be overdriven by the driving shaft and a second clutch means to lock up said planetary gear train for two-way drive cooperable with said fluid coupling to provide a coast drive turbo brake.

3. In a transmission, a driving shaft, a hydrodynamic torque converter comprising a casing, relatively rotatable, vaned, impeller turbine and reaction wheels within said casing arranged to provide a closed toroidal fluid circulating circuit, said reaction wheel having variable pitch vanes automatically movable between low and high torque positions, an overdrive planetary gear train within the converter casing drivingly connected between said driving shaft and the impeller, said overdrive gearing comprising a planet pinion carrier drivingly connected to said casing and mounting rotatable pinion gearing, a ring gear meshing with the pinion gearing and drivingly connected to said impeller and a sun gear meshing with said pinion gearing, a first one-way clutch means connected to said overdrive gear train and operable to lock-up the overdrive gearing and provide for direct drive of the impeller by the driving shaft, a housing enclosed, fillable, fluid coupling comprising a pair of vaned rings one of which is anchored against rotation and the other of which is drivingly connected to a rotatable gear element of the overdrive gear train, means operable to selectively fill and empty the fillable fluid coupling whereby said other vaned ring may be selectively permitted to rotate free and to be restrained against rotation by the braking action of the filled coupling, said braking action causing the overdrive gearing to be activated to cause the impeller to be overdriven by the driving shaft and a second two-way clutch connected to the overdrive gearing and operable when engaged to cause the driving shaft to directly drive the impeller for coast braking.

4. In a transmission, a driving shaft, a hydrodynamic torque converter comprising a casing, relatively rotatable, vaned, impeller turbine and reaction wheels within said casing arranged to provide a closed toroidal fluid circulating circuit, said reaction wheel having variable pitch vanes automatically movable between low and high torque positions, an overdrive planetary gear train within the converter casing drivingly connected between said driving shaft and the impeller, said overdrive gearing comprising a planet pinion carrier drivingly connected to said casing and mounting rotatable pinion gearing, a ring gear meshing with the pinion gearing and drivingly connected to said impeller and a sun gear meshing with said pinion gearing, a first one-way clutch means connected to said overdrive gear train and operable to lock-up the overdrive gearing and provide for direct drive of the impeller by the driving shaft, a housing enclosed, fillable, fluid coupling comprising a pair of vaned rings one of which is anchored against rotation and the other of which is drivingly connected to a rotatable gear element of the overdrive gear train, means operable to selectively fill and empty the fillable fluid coupling whereby said other vaned ring may be selectively permitted to rotate free and to be restrained against rotation by the braking action of the filled coupling, said braking action causing the overdrive gearing to be activated to cause the impeller to be overdriven by the driving shaft, a second two-way clutch connected to the overdrive gearing and operable when engaged to cause the driving shaft to directly drive the impeller and control means arranged to engage said second clutch and to fill said fillable coupling simultaneously to provide a turbo brake effect for coast braking.

References Cited in the file of this patent
UNITED STATES PATENTS

| | | |
|---|---|---|
| 2,281,077 | Pollard | Apr. 28, 1942 |
| 2,325,876 | Pollard | Aug. 3, 1943 |
| 2,339,015 | Jandasek | Jan. 11, 1944 |
| 2,343,509 | Jandasek | Mar. 7, 1944 |
| 2,351,213 | James | June 13, 1944 |
| 2,612,791 | Miller et al. | Oct. 7, 1952 |
| 2,740,304 | Sheppard | Apr. 3, 1956 |
| 2,747,433 | Forster | May 29, 1956 |
| 2,748,899 | Booth | June 5, 1956 |

OTHER REFERENCES

"Automotive Industries," page 65, Feb. 1, 1956.